(No Model.)
4 Sheets—Sheet 1.
W. J. KEEP.
IMPACT TESTING MACHINE.
No. 403,676.
Patented May 21 1889.
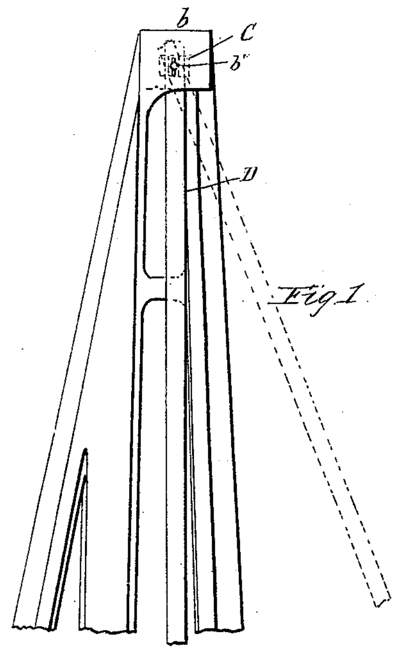
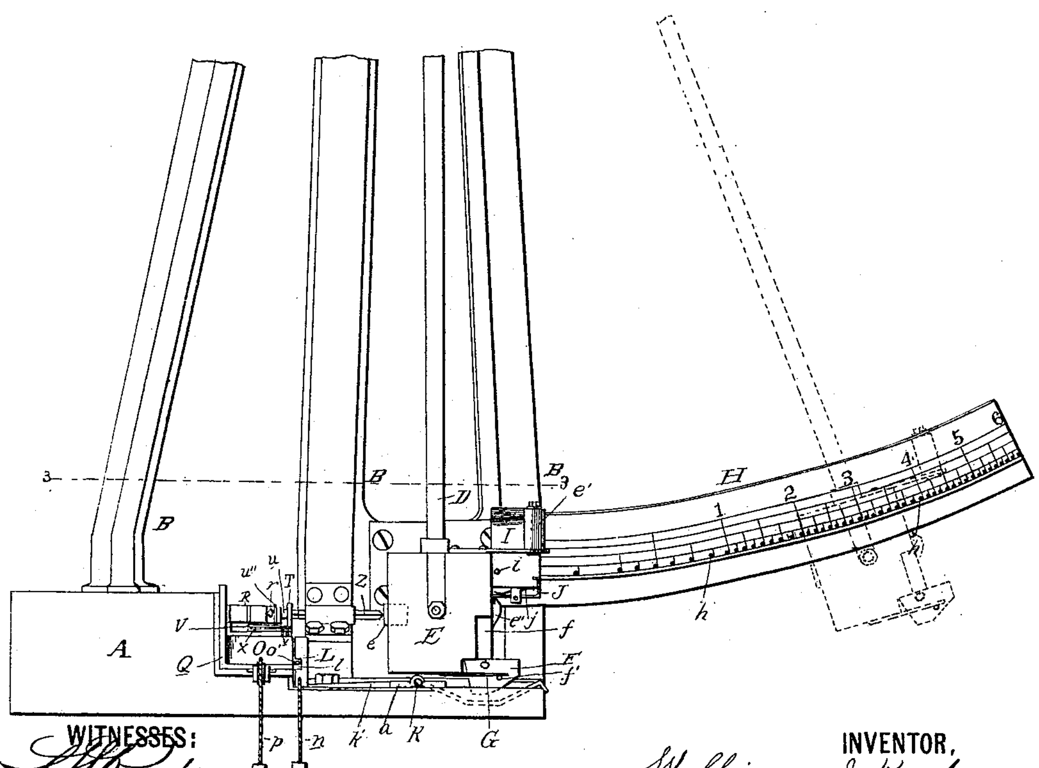
WITNESSES:
INVENTOR,
William J. Keep
BY T. J. W. Robertson
ATTORNEY.
N. PETERS, Photo-Lithographer, Washington, D. C.

(No Model.)
4 Sheets—Sheet 2.
W. J. KEEP.
IMPACT TESTING MACHINE.
No. 403,676. Patented May 21 1889.
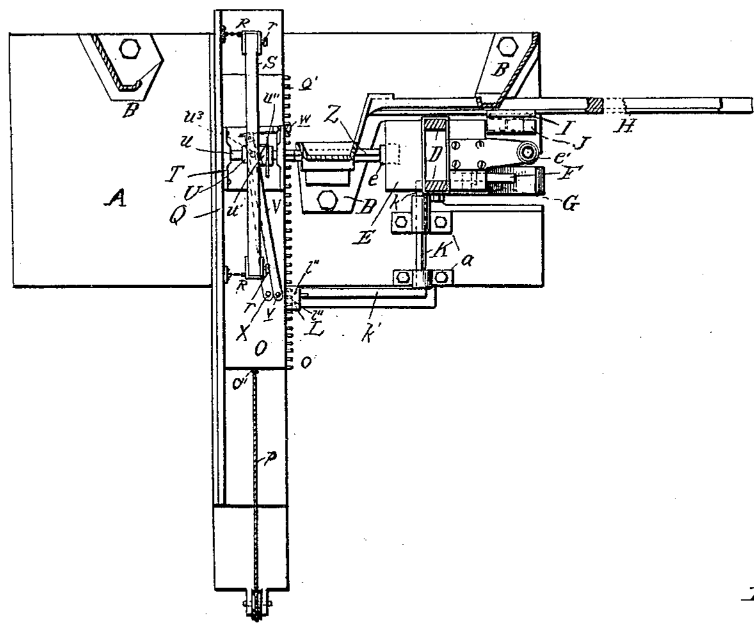
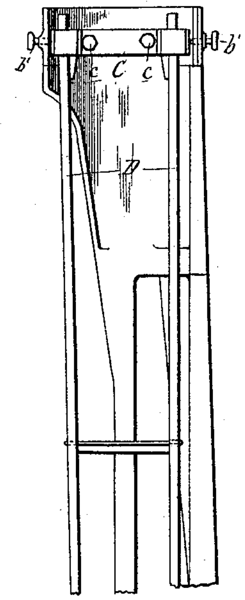
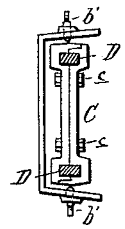
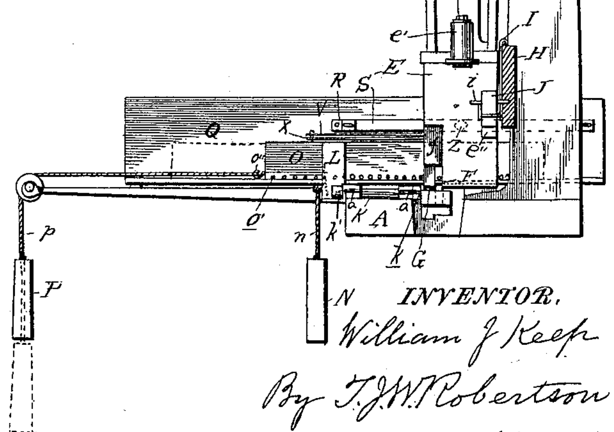
WITNESSES.
INVENTOR.
William J. Keep
By T. J. W. Robertson
Attorney.
N. PETERS, Photo-Lithographer, Washington, D. C.

(No Model.)
4 Sheets—Sheet 3.
W. J. KEEP.
IMPACT TESTING MACHINE.
No. 403,676. Patented May 21 1889.
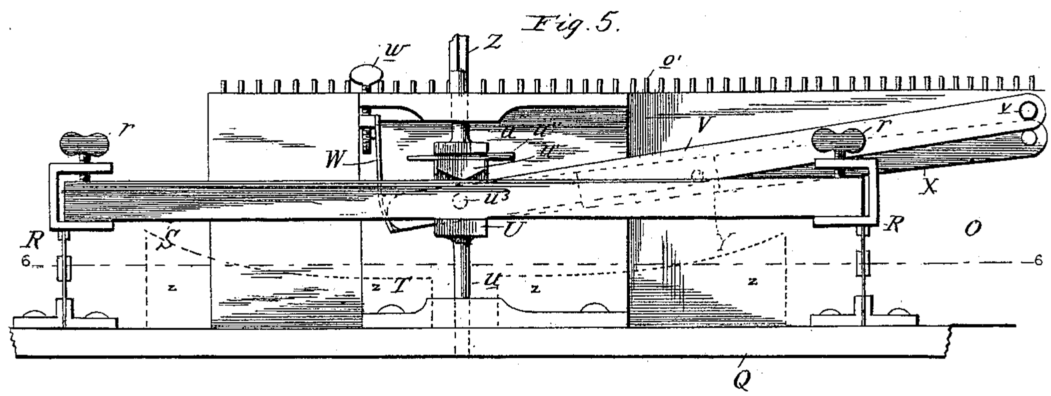
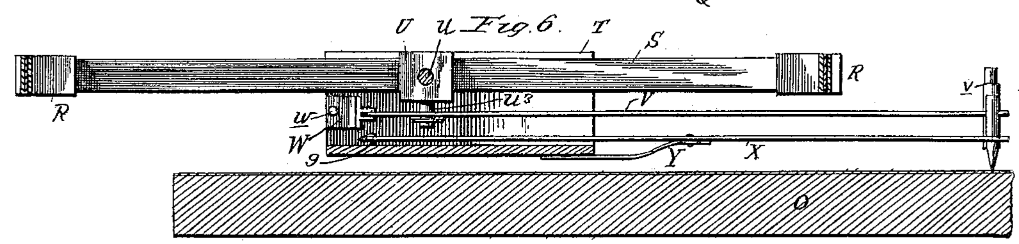
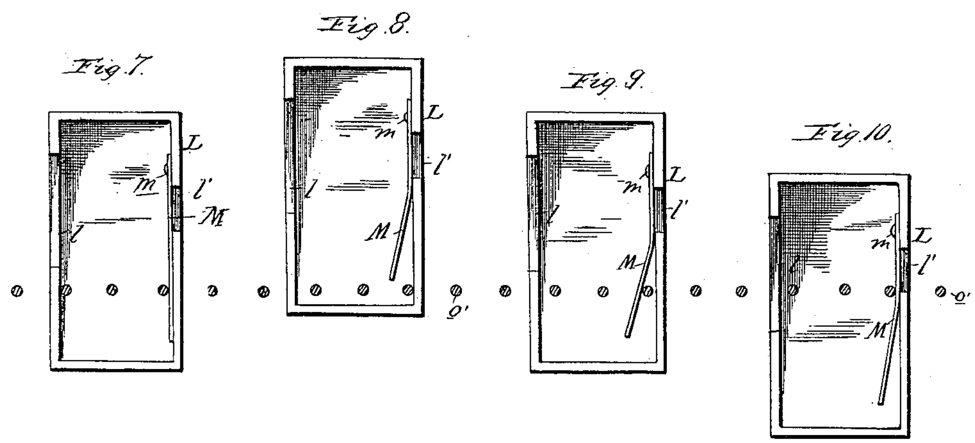
WITNESSES.
INVENTOR.
William J. Keep,
By T. J. W. Robertson
Attorney.
N. PETERS, Photo-Lithographer, Washington, D. C.

(No Model.)
4 Sheets—Sheet 4.
W. J. KEEP.
IMPACT TESTING MACHINE.
No. 403,676.
Patented May 21 1889.
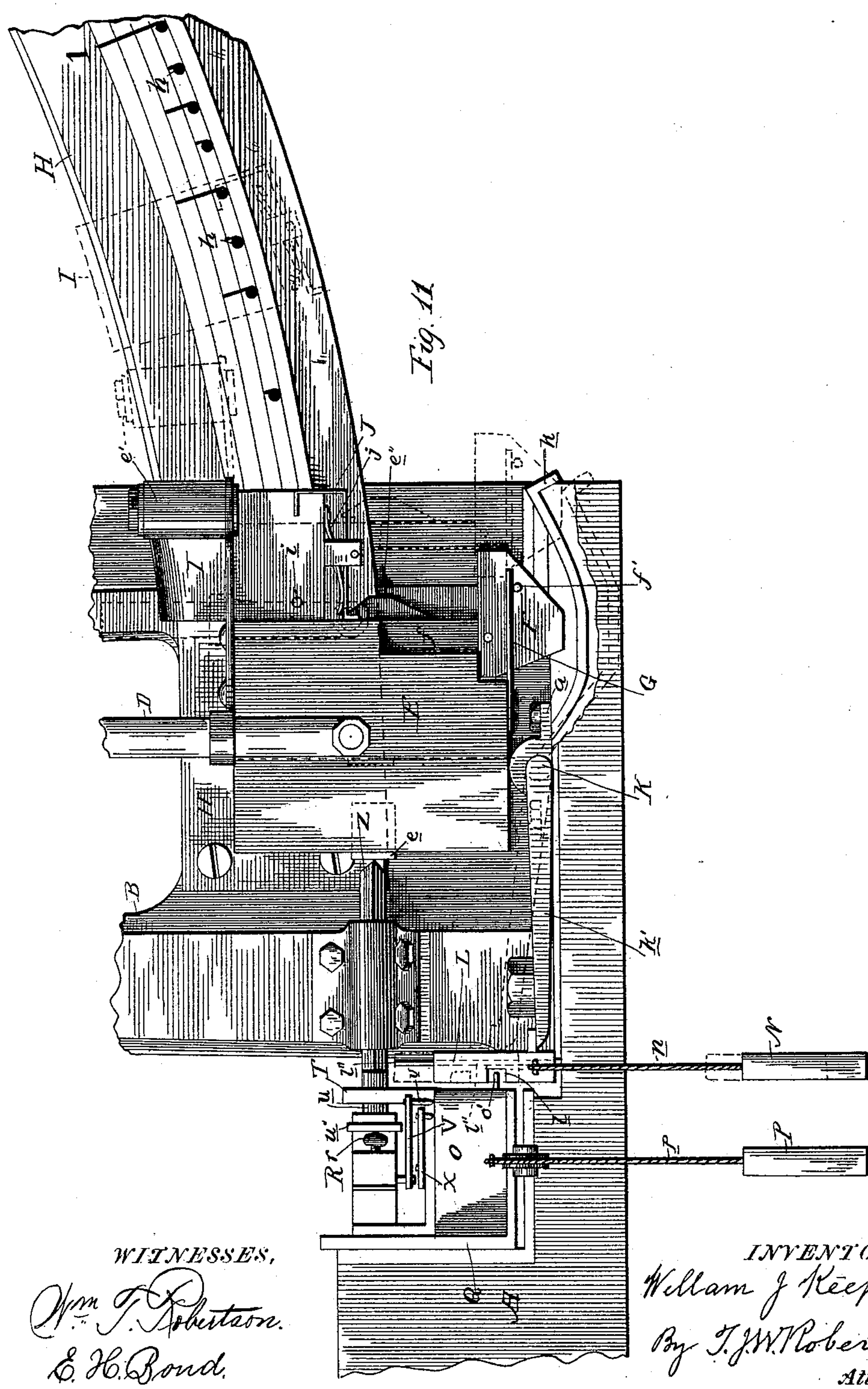
WITNESSES,
Wm. T. Robertson.
E. H. Bond.
INVENTOR
William J Keep
By T. J. W. Robertson
Attorney
N. PETERS. Photo-Lithographer. Washington, D. C.

UNITED STATES PATENT OFFICE.

WILLIAM J. KEEP, OF DETROIT, MICHIGAN.

IMPACT TESTING-MACHINE.

SPECIFICATION forming part of Letters Patent No. 403,676, dated May 21, 1889.

Application filed July 20, 1888. Serial No. 280,462. (No model.)

*To all whom it may concern:*

Be it known that I, WILLIAM J. KEEP, a citizen of the United States, residing at Detroit, in the county of Wayne and State of Michigan, have invented certain new and useful Improvements in Impact Testing-Machines, of which the following is a specification, reference being had therein to the accompanying drawings.

This improvement relates to a machine designed to test the number and force of the blows necessary to break a bar; and the invention consists in the construction, arrangement, and combination of parts, hereinafter more particularly described, and then definitely pointed out in the claims.

In the appended drawings, Figure 1 shows a front elevation of the machine; Fig. 2, an end elevation; Fig. 3, a horizontal section through the line 3 3 on Fig. 1. Fig. 4 is a plan of the head or top of the machine removed. Fig. 5 is a plan, on an enlarged scale, of a recording mechanism and its immediate connections. Fig. 6 is a vertical section of the same parts on line 6 6 on Fig. 5. Figs. 7, 8, 9, and 10 are enlarged views of a slide detached, whose office will be more fully hereinafter explained. Fig. 11 shows an enlarged side view of the hammer with portions of some of the connecting parts.

Referring now to the details of the drawings by letter, A represents a base from which rises a frame consisting of three legs, B B B, united at the top to form a head, *b*, in which are set two center screws, *b'*, that work in centers formed in a cross-head, C, preferably formed in two sections, as shown in Fig. 4, and united by bolts *c*. In the cross-head are secured the bars D, which extend downward and carry the weight E, having attached thereto a breaker or hammer, *e*, (shown detached and on a larger scale in Fig. 11,) and handle *e'*.

Pivoted in a recess in the weight at *f* is a dog, F, which is held in its normal position by a spring, G, attached at one end to the weight and having its other end pressing on a pin, *f'*, on the dog F, which keeps one corner of the dog pressed against the under side of the recess in the weight, as shown in Fig. 1, and also in a larger scale in Fig. 11.

Attached to one or more of the legs, or to the base, as preferred, is a graduated arc, H, having at each graduation a small hole, *h*. On this arc is a slide, I, having a pin, *i*, by which said slide may be securely held at any desired position by passing said pin into the hole at the desired graduation. This slide carries a pivoted trip, J, and a spring, *j*, the two being so arranged as to normally keep the trip J in the position shown in Fig. 1, where it is shown engaging with a lip, *e''*, on the weight.

Set in suitable bearings, *a*, in the base is a rock-shaft, K, one end of which carries an arm, *k*, and the other another arm, *k'*, and the latter engages with a hollow slide, L, sliding on rods *l''* and having openings *l l'* in its opposite sides, (see Fig. 7,) and carrying a spring, M, one end of which is securely fastened to one of the inner sides of the slide at *m*.

At N is a weight carried by a cord, *n*, to draw the slide L downward after it has been raised by the arm *k'*.

O indicates a diagram-paper holder, which moves in suitable guides *o* on the base, and is provided with a series of pins, *o'*, and a hook, *o''*, to which is suspended a weight, P, by the cord *p*, which tends to draw the paper-holder toward the left, as shown in Fig. 2, when liberated by the slide L, as hereinafter explained.

Attached to a plate, Q, rising from the base of the machine, are two supports, R, for the test-bar S, which are provided with set-screws *r*, to securely hold the test-bar in position.

To the plate Q is secured by screws or otherwise a box-bearing, T, having holes in its opposite sides to receive the guide-rods *u* of the cage U. (See Figs. 5 and 6.) This cage is designed to be clamped to the test-bar by means of the movable jaw *u'* and wedge *u''*, and has on its bottom a pin, $u^3$, which works in a hole in a pencil-holder, V, carrying a pencil, *v*, and held in position by the flexible plate W, which is supported by one of the flanges of the box-bearing T and adjusted by the set-screw *w*, passing through said flange, and by turning which screw the position of the pencil on the paper may be adjusted as desired. A second pencil-holder, X, is pivoted at *y* to the box-bearing T, which holder is provided with a spring, Y, that bears against the under side of the bearing, as shown in Fig. 6.

At Z is shown a transmitter, which works substantially frictionless through guides formed in one of the legs B, and receives the blow of the hammer and weight and transmits the same to the cage.

The operation is as follows: Supposing the test-bar to be secured in place and the diagram-paper holder supplied with paper, the slide I is moved to the first graduation, and the operator draws back the weight by the handle $e'$ until the trip catches on the lip $e''$ on the weight. The operator then presses on the trip J, thus liberating the weight and allowing it to strike a blow on the transmitter, which blow is transferred to the test-bar through the medium of the cage. The slide I is now set another graduation farther back and the above operation repeated. The slide is then again set back, as before, and the operation is repeated until the bar is broken, the slide I being set farther back after every blow. At every forward motion of the weight the dog F depresses the arm $k$, and thus, through the aid of arm $k'$, raises the slide L until the first one of the pins $o'$ (which is temporarily in contact with the spring M, as shown in Fig. 7) has passed below said spring, as shown in Fig. 8, so as to pass behind the spring as the slide is pulled down by the weight, as shown in Fig. 9, and finally pass out of the slide, as shown in Fig. 10, allowing the next pin to come in contact with the spring, as shown in the same figure, and thus as the pins escape from the slide L the diagram-paper holder moves the distance between two pins. The return motion of the hammer has no effect on the slide, as the dog F swings upward on its pivot, as shown in dotted lines in Fig. 11, and does not operate the arm $k'$. At each blow of the weight the pencil in the holder V makes a mark corresponding to the deflection of the center of the test-bar, but in an exaggerated degree, and on the recovery of the bar the pencil returns to its former position, when the weight is again raised and the paper-carrier moved another pin, as before explained, and thus a horizontal mark is made by the pencil. If the test-bar has received any "set," this pencil will record such set as measured from the base-line on the paper, and thus the total deflection at each blow is measured and recorded; but a more definite record is given by the pencil in the holder X, which is moved by the first pencil-holder, V, coming in contact with it at each deflection and gradually moving it across the paper.

The pencil-holders may be proportioned to multiply the amount of deflection to any desired extent; but I prefer to so proportion them that the deflection will be multiplied about five times. As the test-bar is liable to break on one side of the center, which would be likely to twist and probably break the cage and the pencil-holders, I propose to use the guards $z$ $z$, (shown in dotted lines,) which will catch the long end of the broken bar, and the bar will then be broken in the center, thus allowing the cage to move properly in its guides.

What I claim as new is—

1. The combination, in a testing-machine, of a support for a hammer, a swinging hammer pivoted thereto, and a graduated arc curved to substantially correspond with the path of the hammer for gaging the force of the blow of said hammer, substantially as described.

2. The combination, in a testing-machine, of a swinging hammer, a graduated arc, a movable gage sliding on the arc and arranged to be held at any desired point thereon, and provided with a trip to retain and liberate the hammer, as desired, substantially as described.

3. The combination, in a testing-machine, of a reciprocating hammer and a transmitter arranged to receive the blow of the hammer and transmit it to the test-bar, as set forth.

4. The combination, in a testing-machine, of a support for the test-bar, a diagram-paper holder, a pencil-holder, and a connection, as the cage U, between the pencil-holder and the test-bar, arranged to be firmly clamped to said test-bar, substantially as described.

5. In a testing-machine, a hammer constructed and arranged to give the article under test a series of blows, and an intermittingly-moving diagram-paper holder, in combination with a pencil-holder connected to and moving with the article being tested, whereby the permanent sets of the succeeding blows are recorded, substantially as described.

6. In a testing-machine having a hammer constructed to give the article under test a series of blows, an intermittingly-moving pencil-holder arranged to move with the article being tested and make a zigzag line, thus recording the deflection after each blow and the total deflection of the test-bar, substantially as described.

7. In a testing-machine, a diagram-paper holder provided with means, as the moving weight, slide, and pins, for automatically moving said holder between each test, substantially as described.

8. In a testing-machine, a diagram-holder, a pencil-holder connected with the test-bar and moving therewith, and a second pencil-holder disconnected from the test-bar and operated by the first-mentioned pencil-holder, substantially as described.

9. The combination, in a testing-machine having a hammer constructed to give the article under test a series of blows, of a pencil-holder with an intermittingly-moving diagram-paper holder, substantially as described.

10. The combination, in a testing-machine having a moving hammer, of a pencil-holder, a diagram-paper holder, and means, as the dog F and slide I and intermediate connection between said dog and slide, for giving a short motion to the paper-holder at each blow of the hammer, substantially as described.

11. In a testing-machine having a moving hammer, the combination, with a pencil-carrier and a diagram-paper holder having pins $o'$, of the slide L, spring M, and the dog F, moving with the hammer and operating through intermediate connections said slide L at each movement of the hammer, substantially as described.

12. In a testing-machine, and in combination with the frame and hammer thereof, the clamps R R, connected with the frame and arranged to firmly hold the test-bar in place against the recoil after each blow of the hammer, substantially as described.

13. In a testing-machine, in combination with the breaker thereof, guards, as $z\ z$, to prevent damage from unequal breakage of the bar, said breaker and guards being arranged on opposite sides of the test-bar.

14. The combination, in a testing-machine, of a moving hammer arranged to give a series of blows and a recorder constructed to indicate the number and force of the blows given by the hammer, substantially as described.

15. In a testing-machine, and in combination with the breaker thereof and a support for the test-bar, an indicating-arm, as V, and means, as the cage U and pin $u^3$, for communicating the motion of the test-bar to said indicating-arm, substantially as described.

16. The combination, in a testing-machine and with the base thereof, of a vertical support for a hammer, a swinging hammer hanging therefrom, and a graduated arc curved to substantially correspond with the path of said hammer for gaging the force of the blow, substantially as described.

17. The combination, in a testing-machine and with the base thereof, of a vertical support for a hammer, a swinging hammer hanging therefrom, a graduated arc curved to substantially correspond with the path of the hammer, and a slide running on said arc provided with a holding and liberating device, as the trip J, for holding and releasing the hammer at any desired position, substantially as described.

18. The combination, in a testing-machine, of a swinging hammer, a graduated arc curved to substantially correspond with the path of the hammer, a gage for holding and releasing the hammer, and means, as the pin $i$, for holding said gage in any desired position, substantially as described.

In testimony whereof I affix my signature, in presence of two witnesses, this 17th day of July, 1888.

WILLIAM J. KEEP.

Witnesses:
L. B. YOUNG,
ISAAC S. FILER.